United States Patent

[11] 3,624,206

| [72] | Inventors | Pier Nicola Giraldi<br>Milan;<br>Vittorio Mariotti, Pesaro, both of Italy |
|---|---|---|
| [21] | Appl. No. | 812,512 |
| [22] | Filed | Feb. 3, 1969 |
| [45] | Patented | Nov. 30, 1971 |
| [73] | Assignee | Carlo Erba S.p.A.<br>Milan, Italy |
| [32] | Priorities | Sept. 23, 1966 |
| [33] | | Italy |
| [31] | | 22,771/66;<br>Dec. 31, 1966, Italy, No. 31,818A/66<br>Continuation of application Ser. No.<br>769,441, Oct. 21, 1968, now abandoned,<br>Continuation of application Ser. No.<br>669,380, Sept. 21, 1967, now abandoned.<br>This application Feb. 3, 1969, Ser. No.<br>812,512 |

[54] 3-SUBSTITUTED AND 2,3-SUBSTITUTED-1-OXO ISOINDOLINES AND THERAPEUTIC USE THEREOF
6 Claims, No Drawings

| [52] | U.S. Cl. | 424/267 |
|---|---|---|
| [51] | Int. Cl. | A61k 27/00 |
| [50] | Field of Search | 260/999;<br>424/267 |

*Primary Examiner*—Stanley J. Friedman
*Attorney*—Cushman, Darby & Cushman

ABSTRACT: 1-Oxo-3-(aminophenyl-p-ethoxy(and propoxy) piperidino)-isoindolines and 1-oxo-2-ethyl-3-(aminophenyl-p-ethoxy(and propoxy)piperidino)-isoindolines are disclosed. These compounds have spasmolytic activity and are therapeutically useful.

3-SUBSTITUTED AND 2,3-SUBSTITUTED-1-OXO ISOINDOLINES AND THERAPEUTIC USE THEREOF

This application is a continuation in part of Ser. No. 769,441, filed Oct. 21, 1968 now abandoned, which was a continuation of Ser. No. 669,380, filed Sept. 21, 1967, now abandoned.

The present invention is directed to new 3-substituted 1-oxo-isoindolines and 2,3-substituted 1-oxo-isoindolines having spasmolytic activity.

The compounds of the present invention have the following general formula:

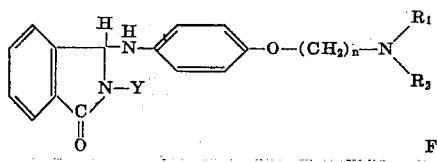

Formula I wherein Y is hydrogen or the ethyl radical, $n$ is 2 or 3, and $R_1$ and $R_2$, taken together with the nitrogen atom, is piperidino. Especially preferred compounds are 1-oxo-2-ethyl-3-(aminophenyl-p-ethoxypiperidino)-isoindoline (Y is the ethyl radical and $n$ is 2) and 1-oxo-3-(aminophenyl-p-propoxypiperidino)-isoindoline (Y is hydrogen and $n$ is 3).

The compounds of the present invention may be prepared, when Y is hydrogen, by reacting 3-hydroxy-phthalimidine of the formula:

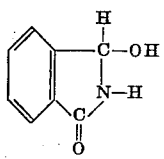

Formula II

With an amine of the formula:

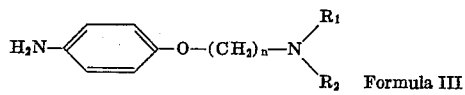

Formula III

In order to obtain compounds wherein Y is the ethyl radical, alkylation may be subsequently carried out on the product obtained by the above process. However, this alkylation does not give a high yield of the desired compound, because of the formation of secondary products. The alkylation reaction produces byproduct compounds of the formula:

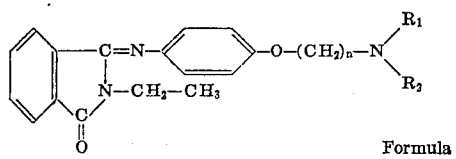

Formula III-A

The above byproduct compounds may be reduced to produce the compounds of the present invention.

Therefore, the preferred method of preparing compounds of the above general formula wherein Y is the ethyl radical is reacting 2-ehtyl-3-hydroxy-phthalimidine with thionylchloride, producing an intermediate compound of the formula:

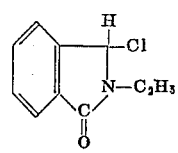

Formula IV

Subsequently, the above intermediate compound is reacted with the amine of formula III (above) to produce the desired compound.

By reacting the compounds of the present invention with organic and inorganic acids, such as, for instance, hydrochloric, sulfuric, citric and tartaric acids, the corresponding water-soluble salts may be obtained. The pharmaceutically acceptable salts of the compounds of the present invention are also useful because of their spasmolytic activity.

The 1-oxo-isoindoline derivatives of the present invention have shown a good papaverinelike spasmolytic effectiveness which can be exploited from the chemical viewpoint, whereas the slight atropinelike activity limits the parasympathicolytic side effects.

The invention will be understood more readily be reference to the following examples; however, these examples are intended to illustrate the invention and are not to be construed to limit the scope of the invention.

EXAMPLE 1

Preparation of 1-oxo-2-ethyl-3-(aminophenyl-p-ethoxypiperidino)-isoindoline 10 grams of 2-ethyl-3-hydroxy-phthalimidine (0.056 mole) are dissolved in 50 ml. of anhydrous $CHCl_3$. To the solution so obtained is added 4.12 ml. of $SOCl_2$ (0.056 mole). This mixture is stirred for 48 hours, and then 5.4 ml. of α-picoline (0.056 mole) and 12.5 grams p-aminophenyl-ethoxypiperidine (0.056 mole) are added. This mixture is then stirred for 10 hours at room temperature. 1-oxo-2-ethyl-3-(aminophenyl-p-ethoxypiperidino)-isoindoline HCl is obtained by precipitation with petroleum ether. This compound was reacted at room temperature with a slight excess of NaOH to obtain the corresponding base, 1-oxo-2-ethyl-3-(aminophenyl-p-ethoxypiperidino)-isoindoline.

EXAMPLE 2

Preparation of 1-oxo-2-ethyl-3-(aminophenyl-p-ethoxypiperidino)-isoindoline 31.3 grams of 1-oxo-3-(aminophenyl-p-ethoxypiperidino)-isoindoline (0.0892 mole) are dissolved in 500 ml. of anhydrous N,N-dimethylformamide. To this solution 5.75 grams of NaH (0.105 mole) and 7.24 ml. of $CH_3CH_2I$ (0.0945 mole) are added and the resulted mixture is heated at 70° C. for 1 hour, and then poured into an excess of water. 1-oxo-2-ethyl-3-(aminophenyl-p-ethoxypiperidino)-isoindoline (m.p. 106°–107° C.) is obtained by crystallization with ligroin.

1-oxo-2-ethyl-3-(iminophenyl-p-ethoxypiperidino)-isoindoline (m.p. 103°–104° C.) is obtained as a byproduct with the above compound. This latter compound was reduced to produce 1-oxo-2-ethyl-3-(aminophenyl-p-ethoxypiperidino)-isoindoline.

EXAMPLE 3

Preparation of 1-oxo-3-(aminophenyl-p-ethoxypiperidino)-isoindoline 5 grams of 3hydroxy-phthalimidine (0.033 mole) are dissolved in 50 ml. of N-N-dimethylformamide. To the solution so obtained is added 10 grams of p-aminophenyl-ethoxy-piperidine (0.045 mole) and the resulting mixture is refluxed for 5 hours After that, the mixture is cooled with the addition of ice. The precipitate thus obtained is purified by crystallization from ethanol (99.9 percent purity) resulting in the recovering of 1-oxo-3-(aminophenyl-p-ethoxy-piperidino)-isoindoline (m.p. 180°–181° C.).

EXAMPLE 4

Preparation of 1-oxo-3-(aminophenyl-p-propoxypiperidino)-isoindoline

The process of example 3 was repeated, except p-aminophenyl-propoxy-piperidine replaced, on an equal molear basis, the p-aminophenyl-ethoxy-piperdine. The product obtained was 1-oxo-3-(aminophenyl-p-propoxy-piperidino)-isoindoline.

EXAMPLE 5

Use of the Compounds of Examples 1 and 4

1-oxo-2-ethyl-3-(aminophenyl-p-ethoxypiperidino)- isoindoline (hereinafter cmpd.ex. 1) and 1-oxo-3-(aminophenyl-p-propoxypiperidino)-isoindoline (hereinafter cmpd.ex. 4) were subjected to in vitro and in vivo tests for evaluation of both spasmolytic effectiveness and toxicity, as well as the presence of side effects. The tests were carried out in compliance with experimental dosage schemes with multiple points (three as a minimum) and several lines. Ratios of the e effectiveness of each product, as compared to an atropine standard, were evaluated.

In vitro effect:

The inhibition of contractures produced by acetylcholine ($4\times10^{-7}\times10^{-7}$), $BaCl_2$ ($5 \times 10^{-4}$), Histamine ($4 \times 10^{-7}$) and Nicotin ($4.5\times10^{-5}$) on guinea pig intestine was determined, with $pA_2$ values as reported by H. O. Schild (Brit. J. Pharmacoli 2, 189, 1947), with the following results:

| | | | |
|---|---|---|---|
| Antiacetylcholine effectiveness | Cmpd.Ex. 1 | 7,089 | (0.065) |
| | Cmpd.Ex. 4 | 6,978 | (0.024) |
| | Atropine | 8,480 | (0.047) |
| | Papaverine | 5,066 | (0.203) |
| Anti-$BaCl_2$ effectiveness | Cmpd.Ex. 1 | 7,145 | (0.160) |
| | Cmpd.Ex. 4 | 7,194 | (0.066) |
| | Atropine | 8,463 | (0.062) |
| | Papaverine | 5,363 | (0.220) |
| Antihistaminic effectiveness | Cmpd.Ex. 1 | 5,189 | (0.045) |
| | Cmpd.Ex. 4 | 5,428 | (0.000) |
| | Atropine | 6,144 | (0.265) |
| | Papaverine | 4,588 | (0.001) |
| | Pyribenzamine 8,428 | (0.336) | |
| Antinicotin effectiveness | Cmpd.Ex. 1 | 6,680 | (0.141) |
| | Cmpd.Ex. 4 | 6,820 | (0.408) |
| | Atropine | 7,742 | (0.042) |
| | Papaverine | 4,941 | (0.435) |

The above values refer respectively to the average (figures out of brackets) and to the standard deviation (figures within brackets) obtained by repeated determination tests.

In vivo effect a. Inhibition of progress of a charcoal meal through the intestine in animals (mice) with peristalsis accelerated by hypodermic treatment with metacholine (0.5 mg./kg.). The products under test were given orally 30 minutes before metacholine treatment.

| Effectiveness ratios | Cmpd.Ex. 1/Atropine | =0.11 |
|---|---|---|
| | Cmpd.Ex. 4/Atropine | =0.08 | b. Inhibition of progress of a charcoal meal through the intestine in animals (mice) with peristalsis accelerated by hypodermic administration of $BaCl_2$(20 mg./kg.). The products under test were given orally 30 minutes before $BaCl_2$ treatment.

| Effectiveness ratios | Cmpd.Ex. 1/Atropine | =2.44 |
|---|---|---|
| | Cmpd.Ex. 4/Atropine | =2.35 | c. Inhibition of progress of a charcoal meal through the intestine in animals (mice) with peristalsis accelerated by hypodermic treatment with $BaCl_2$ (7.5 mg./kg.), also with sympathetic and parasympathic systems respectively blocked by atropine (2 mg./kg.) and guanetidine (5 mg./kg.) both given by the hypodermic route. The products under test were given orally 30 minutes before administration of $BaCl_2$ and 15 minutes before atropine and quanetidine.

| Effectiveness ratios | Cmpd.Ex. 1/Atropine | =1.75 |
|---|---|---|
| | Cmpd.Ex. 4/Atropine | =1.58 | d. Mydriatic effect in mice after administration of the drugs under test orally 30 minutes before measurement of pupillary diameter by macroscopic examination.

| Effectiveness ratios | Cmpd.Ex. 1/Atropine | =0.06 |
|---|---|---|
| | Cmpd.Ex. 4/Atropine | =0.02 | e. Inhibition of scyalorrhea caused in mice by administration of carbaminoylcholine (1.25 mg./kg.) by intraperitoneal route, 30 minutes after administration of the subject drugs orally. Ponderal determination of the saliva sample was carried out immediately after resorption on blotting-paper within the first 4 minutes following administration of carbaminoylcholine.

| Effectiveness ratios | Cmpd.Ex. 1/Atropine | =0.12 |
|---|---|---|
| | Cmpd.Ex. 4/Atropine | =0.02 | f. Inhibition of bradicardia caused in mice by intraperitoneal treatment with carbaminoylcholine (0.5 mg./kg.) 2 minutes before determination of heart frequency (by E.K.G.) and 30 minutes after administration of the subject drugs orally.

| Effectiveness ratios | Cmpd.Ex. 1/Atropine | =0.27 |
|---|---|---|
| | Cmpd.Ex. 4/Atropine | =0.13 |

The evaluation of the effectiveness of the compounds of the present invention has also been carried out in cats under narcosis conditions, with record of pressure graphic, gastric motility duodenum and gall bladder functionality both in rest and after vagal stimulation. The treatment was carried out by introvenous route and orally. The drugs tested confirmed the effects evidenced in tests with mice; with cmpd.ex. 1 and cmpd.ex. 4, at a dose of 100 mg./kg., inhibiting hyperperistalsis and contractures caused by vagal stimulation; whilst vagal bradicardia was practically not influenced. The behavior of atropine is quite different: at a commensurable posology, in fact, it inhibits the effects of vagal stimulation at both enteric and cardiac levels.

Tests for an evaluation of side effects have also been carried out on dogs, recording—in comparison with atropine—heat behavior and frequency, pupillary diameter and dryness rates in the gullet. These tests have confirmed that, while atropine precociously influences both the behavior of motility and of the vegetative functions tested, administration of cmpd.ex. 1 or cmpd.ex. 4 at doses even 10—20 times higher, results in a symptomatology still below that brought about by atropine.

Acute toxicity in mice was the following:

| $LD^{50}$ orally: | Cmpd.Ex. 1 | =176 (116–267) reliable limits 95% |
|---|---|---|
| (mg./kg.) | Cmpd.Ex. 4 | =357 (316–403) reliable limits 95% |
| $LD^{50}$ by introvenous route: | | Cmpd.Ex. 1=44.8(39.6–50.6) rel. lim. 95% |
| (mg./kg.) | | Cmpd.Ex. 55(52.4–57.7) rel. lim.95% |

Chronic dosages in mice (5, 10, 20 1 mg./kg. and dogs (0.15 and 1 mg./kg. daily for 3 months) has evidenced no chronic toxicity signs.

Teratogenic tests in mice (5 and 20 mg./kg. throughout pregnancy) have also proven negative.

Clinical pharmacologic tests have tested the tolerancy of kidney and liver functions as well as blood crasis. Blood pressure, heart frequency and salivation have been also tested. Salivation was evaluated by measuring the quantity of excreted saliva after a 100mg. lactose tablet containing 3 percent malic acid and had been allowed to dissolve in the mouth cmpd.ex. 1 and cmpd.ex. 4 have proven thoroughly tolerable as far as liver and kidney functionality tests, blood crasis and pressure are concerned. The vegetative system is influenced only by doses exceeding 40 mg. per head of test patient, and becomes apparent only by a moderate increase in heart frequency. Pupillary diameter and sialorrhea are influenced to a lesser extent.

Cmpd.Ex. 1 was administered to human patients orally at single dosages starting at 0.5 mg. dosage levels and increasing the dosage level. Each single dose was tested on five patients. They were partly replaced for each single dose. The following investigations were carried out for each patient before administration and at 15, 30, 60, 120, 150 and 180 minute intervals subsequent to administration:
1. pupillary diameter
2. sialorrhea
3. pulse rate Clear signs of activity on the vegetative system were evidenced only by doses exceeding 40 mg. in all test patients who exhibited:
1. Mydriasis: after administration of 45 mg. cmpd.ex. 1 in five test patients, average pupillary diameter increased in 15 minutes from 3.5 mm. to an average diameter of 3.8 mm.
2. Dryness of throat: the quantity of saliva produced has been evaluated by modified Mushin and Herxheimer's method. Fifteen minutes after administration of 45 mg. cmpd.ex. 1 to five test patients, the quantity of saliva produced was reduced to an average figure of 0.3 ml., as compared to the average basic figure of 0.5 ml.
3. Increase of pulse rate: 15 minutes after administration of 45 mg. cmpd.ex. 1 to five test patients, pulse rate increased from an average basic figure of 72 pulsations per minute to an average basic figure of 78 pulsations per minute.

There is no evidence of any troubles in behavior, giddiness, headache, sickness, or gastric pyrosis. No alteration was noted in the blood constituents or in the liver and kidney functions. Similar tests were carried out with cmpd.ex.4, which also showed clear signs of activity on the vegetative system only by doses exceeding 40 mg. The tolerance results were essentially similar to those reported above for cmpd.ex. 1.

PRELIMINARY CLINICAL PHARMACOLOGICAL TESTS

Twenty hospital patients were tested for effects on gastric emptying with a dose of 10 mg. cmpd.ex. 1 administered orally compared to a placebo.

Each test patient was given both the test drug and the placebo at 3 days' interval, in double blindness conditions and random sequences.

Gastric emptying was investigated on radiograms using standard conditions 5, 10, 20, and 40 minutes after administration with use of a planimetric device for gastric opaque area measurement. The data thus obtained shows that administration of a dose of 10 mg. cmpd.ex. 1 orally causes a significant increase in gastric emptying time as compared to gastric emptying rates after administration of a placebo. Forty minutes after administration of 10 mg. cmpd.ex. 1 the logarithmic value of gastric opacity corresponded to 1.4 sq./cm. (average value in 10 test patients), while this value lowered to 1.05 sq./cm. after placebo administration.

Statistic analysis was carried out as recommended by Student's method.

A test similar to that reported above for gastric emptying was conducted with cmpd.ex. 4, at a dose of 10 mg. with essentially similar results. No significant differences in the emptying times were noted after administration of either compound.

While the compounds of the present invention may be administered by any conventional therapeutic method, the preferred methods of administration are by way of tablets, ampuls, and suppositories. Typical formulations for the compounds for the present invention, especially cmpd.ex. 1 and cmpd.ex. 4, are as follows:

| Tablets | Cmpd.Ex. 1 | 10 mg. |
|---|---|---|
| | Lactose | 40 mg. |
| | Starch | 23 mg. |
| | Metylcellulose 23 mg. | |
| | Talc | 4 mg. |
| | Total | 100 mg. |
| Tablets | Cmpd.Ex. 4 | 10 mg. |
| | Lactose | 40 mg. |
| | Starch | 23 mg. |
| | Metylcellulose | 23 mg. |
| | Talc | 4 mg. |
| | Total | 100 mg. |
| Suppositories | Cmpd.Ex. 1 | 10 mg. |
| Glycerids of saturated fatty acids | | 1,005 mg. |
| | Total | 1,015 mg. |
| Suppositories | Cmpd.Ex. 4 | 10 mg. |
| Glycerids of saturated fatty acids | | 1,005 mg. |
| | Total | 1,015 mg. |
| Ampoules | Cmpd.Ex. 1 | 5 mg. |
| | Benzyl alcohol | 0.1 ml. |
| | Propylene glycol | 1 ml. |
| Distilled water Q. S. ad | | 2 ml. |
| Ampoules | Cmpd.Ex. 4 | 5 mg. |
| | Benzyl alcohol | 0.1 ml. |
| | Propylene glycol | 1 ml. |
| Distilled water Q. S. ad | | 2 ml. |

The compounds of the present invention exhibit spasmolytic activities of a wide range of dosage levels. For adults, the effective doses of cmpds.ex. 1 and ex. 4 vary according to the affections: for intravenous use the suggested doses vary from 1 to 5 mg., for the other ways of administration, the suggested doses vary from 5 to 10 mg.

Obviously many modifications and variations of the present invention are possible in the light of the above teachings. It is, therefore, to be understood that within the scope of the appended claims, the invention may be practiced otherwise than as specifically described.

What is claimed is:

1. The therapeutic treatment of spasms, said treatment comprising administering to a patient suffering from spasms a therapeutically effective amount of a compound selected from the group consisting of a compound of the formula:

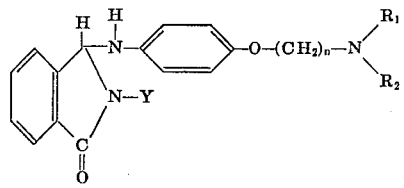

wherein Y is hydrogen or ethyl, $n$ is 2 or 3, and $R_1$ and $R_2$, taken together with the nitrogen atom, are piperidino, and pharmaceutically acceptable salts thereof.

2. The treatment as claimed in claim 1, wherein said compound is 6-oxo-3-(aminophenyl-p-propoxy-piperidino)-isoindoline.

3. The treatment as claimed in claim 1, wherein said compound is a pharmaceutically acceptable salt of 6-oxo-3-(aminophenyl-p-propoxy-piperidino)-isoindoline.

4. The treatment as claimed in claim 1, wherein said compound is 6-oxo-2-ethyl-3-(aminophenyl-p-ethoxy-piperidino)-isoindoline.

5. The treatment as claimed in claim 1, wherein said compound is a pharmaceutically acceptable salt of 6-oxo-2-ethyl-3-(aminophenyl-p-ethoxy-piperidino)-isoindoline.

6. The treatment as claimed in claim 1, wherein said salts are salts of hydrochloric, sulfuric, citric or tartaric acids.

* * * * *

UNITED STATES PATENT OFFICE
CERTIFICATE OF CORRECTION

Patent No. 3,624,206          Dated November 30, 1971

Inventor(s)    Pier Nicola Giraldi et al.

It is certified that error appears in the above-identified patent and that said Letters Patent are hereby corrected as shown below:

Column 6, claims 2 through 5, "6-oxo", each occurrence, should read -- 1-oxo --.

Signed and sealed this 15th day of August 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,624,206　　　　　　　　　　Dated November 30, 1971

Inventor(s) Pier Nicola Giraldi and Vittorio Mariotti Pesaro

It is certified that error appears in the above-identified patent and that said Letters Patent are hereby corrected as shown below:

Column 2, line 62, "3 hydroxy", should be "3-hydroxy";

Column 2, line 66, after the words "5 hours" the full stop (".") is missing;

Column 3, line 17, the word "e" before "effectiveness" is to be deleted;

Column 3, line 22, the value "($4 \times 10^- \times 10^{-7}$)" should be "($4 \times 10^{-7}$)", and line 25, "Pharmacoli" should be "Pharmacol.";

Column 4, line 56, "Cmpd. Ex. 55", should be "Cmpd. Ex. 4=55"; line 57, a bracket is missing after "mg./kg.", and the values therein reported "(5, 10, 20 1 mg./kg.)" are to be modified into "(1, 5, 10, 20 mg./kg.)";

Column 6, line 4, the value "23 mg." related to the metylcellulose is to be placed in its proper column.

Signed and sealed this 27th day of February 1973.

(SEAL)
Attest:

EDWARD M. FLETCHER, JR.　　　　　　ROBERT GOTTSCHALK
Attesting Officer　　　　　　　　　　Commissioner of Patents